US011118719B1

(12) United States Patent
Moreau et al.

(10) Patent No.: US 11,118,719 B1
(45) Date of Patent: Sep. 14, 2021

(54) PIPELINE INSPECTION DEVICE

(71) Applicant: Kakivik Asset Management, LLC, Anchorage, AK (US)

(72) Inventors: Ian Moreau, Eagle River, AK (US); Zhenhua Sun, Anchorage, AK (US)

(73) Assignee: Kakivik Asset Management, LLC, Anchorage, AK (US)

( * ) Notice: Subject to any disclaimer, the term of this patent is extended or adjusted under 35 U.S.C. 154(b) by 0 days.

(21) Appl. No.: 17/181,396

(22) Filed: Feb. 22, 2021

(51) Int. Cl.
*F16L 55/32* (2006.01)
*F16L 101/30* (2006.01)

(52) U.S. Cl.
CPC ........... *F16L 55/32* (2013.01); *F16L 2101/30* (2013.01)

(58) Field of Classification Search
CPC .............................. F16L 55/32; F16L 2101/30
See application file for complete search history.

(56) References Cited

U.S. PATENT DOCUMENTS

| | | | | |
|---|---|---|---|---|
| 5,172,639 A * | 12/1992 | Wiesman | ................ | F16L 55/28 104/138.2 |
| 5,220,869 A * | 6/1993 | Pelrine | ................ | B62D 57/024 104/138.2 |
| 5,284,096 A * | 2/1994 | Pelrine | ................... | B62D 49/04 104/138.2 |
| 5,355,807 A * | 10/1994 | Pelrine | ................. | B62D 57/024 104/138.2 |
| 5,388,528 A * | 2/1995 | Pelrine | ................... | B62D 49/04 104/138.2 |
| 5,565,633 A * | 10/1996 | Wernicke | ............... | G01N 27/82 324/220 |
| 2002/0190682 A1 * | 12/2002 | Schempf | .............. | G01N 29/265 318/568.11 |
| 2014/0020594 A1 * | 1/2014 | Early | ...................... | F16L 55/34 105/26.05 |
| 2018/0313715 A1 * | 11/2018 | Cichosz | ................. | H04N 7/185 |
| 2021/0025533 A1 * | 1/2021 | Duncan | ................... | B08B 9/049 |
| 2021/0025534 A1 * | 1/2021 | Duncan | .................. | B08B 9/051 |
| 2021/0025536 A1 * | 1/2021 | Duncan | ................... | F16L 55/34 |

\* cited by examiner

*Primary Examiner* — Jason C Smith
(74) *Attorney, Agent, or Firm* — Morgan, Lewis & Bockius LLP

(57) ABSTRACT

A device to inspect a pipeline includes a device housing, a plurality of motors, a plurality of wheels, an inertial measurement unit, and a controller. The plurality of motors is coupled to the device housing. The plurality of wheels extends from the device housing. Each wheel is rotatably coupled to a respective motor. The inertial measurement unit is configured to provide a signal corresponding to an orientation of the device housing relative to the pipeline. The controller is configured to independently control operation of each motor of the plurality of motors based on the signal provided by the inertial measurement unit to maintain the device housing within a desired orientation range relative to the pipeline. Because the controller can independently control each motor of the device, the device can advance along a pipeline with minimal human intervention.

29 Claims, 3 Drawing Sheets

PIPELINE INSPECTION DEVICE

TECHNICAL FIELD

The present disclosure relates generally to robotic inspection devices, and more particularly, to robotic inspection devices for pipeline inspections.

BACKGROUND

Pipelines are used around the world to transport fluids for a multitude of applications including refineries and power plants. In some applications, pipelines transport oil or other liquids long distances in remote locations.

Pipelines may be damaged during installation or during the course of use. For example, pipelines can develop cracks, corrosion, erosion, and/or other defects. Defects and/or deterioration of the pipeline over time can lead to the failure of the pipeline. The failure of the pipeline can cause not only a loss of the transported fluid but also injury to persons and the environment. Thus, the integrity of pipelines can be periodically checked to avoid failures.

Damage to the pipeline can include internal damage, external damage not visible to the naked eye, and/or damage obscured by a covering or insulating layer disposed over the pipe. As can be appreciated, certain types of damage to the pipeline may be difficult to detect using visual inspection methods and devices.

Therefore, in some applications, pipelines are physically inspected to find damage that may not be detected using visual inspection methods. Physical inspection methods require physical access to the exterior and/or interior of the pipe and can require that the insulating layer of the pipeline is removed. As a result, physical inspection methods can be time consuming, require high levels of human intervention, and require repair of the insulating layer after inspection.

Therefore, what is needed is an apparatus, system or method that addresses one or more of the foregoing issues, among one or more other issues.

SUMMARY OF THE INVENTION

A device to inspect a pipeline includes a device housing, a plurality of motors, a plurality of wheels, and inertial measurement units, and a controller. The plurality of motors is coupled to the device housing. The plurality of wheels extend from the device housing. Each wheel is rotatably coupled to a respective motor. The inertial measurement unit is configured to provide a signal corresponding to an orientation of the device housing relative to the housing. The controller is configured to independently control operation of each motor of the plurality of motors based on the signal provided by the inertial measurement unit to maintain the device housing within a desired orientation range relative to the pipeline. Because the controller can independently control each motor of the device, the device can advance along a pipeline with minimal human intervention.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

The present disclosure describes embodiments of a pipeline inspection device and methods of use thereof. As described herein, embodiments of the pipeline inspection device and methods of use thereof described herein address the issues described with respect to traditional pipeline inspection devices and methods.

A pipeline inspection device, such as a pipeline inspection robot or pipeline inspection crawler can be used to inspect a pipeline for damage. As described herein, a pipeline inspection device can detect damage that may not be detected from a visible inspection. Further, a pipeline inspection device may require less time and human intervention to inspect the pipeline.

However, traditional pipeline inspection devices may not reliably remain centered on a pipe as the device advances along the pipe. Further, traditional pipeline inspection devices may not reliably navigate around corners or turns of the pipeline. Accordingly, traditional pipeline inspection devices may require personnel to manually intervene to re-center or otherwise re-orientate the device on the pipeline, interrupting the pipeline inspection process.

Additionally, traditional pipeline inspection devices may not provide images of the pipeline that are detailed enough to allow operators to make informed decisions whether repairs are required at an area of interest for the pipeline. In some applications, traditional pipeline inspection devices may require personnel to manually inspect the pipe at the area of interest to determine if repairs are needed. During the manual inspection, the personnel may remove the insulating layer in the surrounding area to manually inspect the pipe at the area of interest.

Therefore, it is desired to provide a pipeline inspection device that can remain reliably centered on the pipeline during the inspection process. Further, it is desired to provide a pipeline inspection device that can reliably navigate corners or turns of the pipeline whilst still inspecting the pipe. Additionally, it is desired to provide a pipeline inspection device that can provide sufficient information to an operator to determine if repairs are needed on the pipeline.

As described herein, embodiments of the pipeline inspection device can include independently operated wheels to allow the pipeline inspection device to remain reliably centered on the pipeline and to reliably navigate corners or turns of the pipeline without human intervention. Further, embodiments of the pipeline inspection device can include an imaging device and processor to allow for increased levels of image detail compared to traditional pipeline inspection devices and to allow for automatic recognition of damaged portions of the pipeline without requiring manual inspections.

Figure 1:
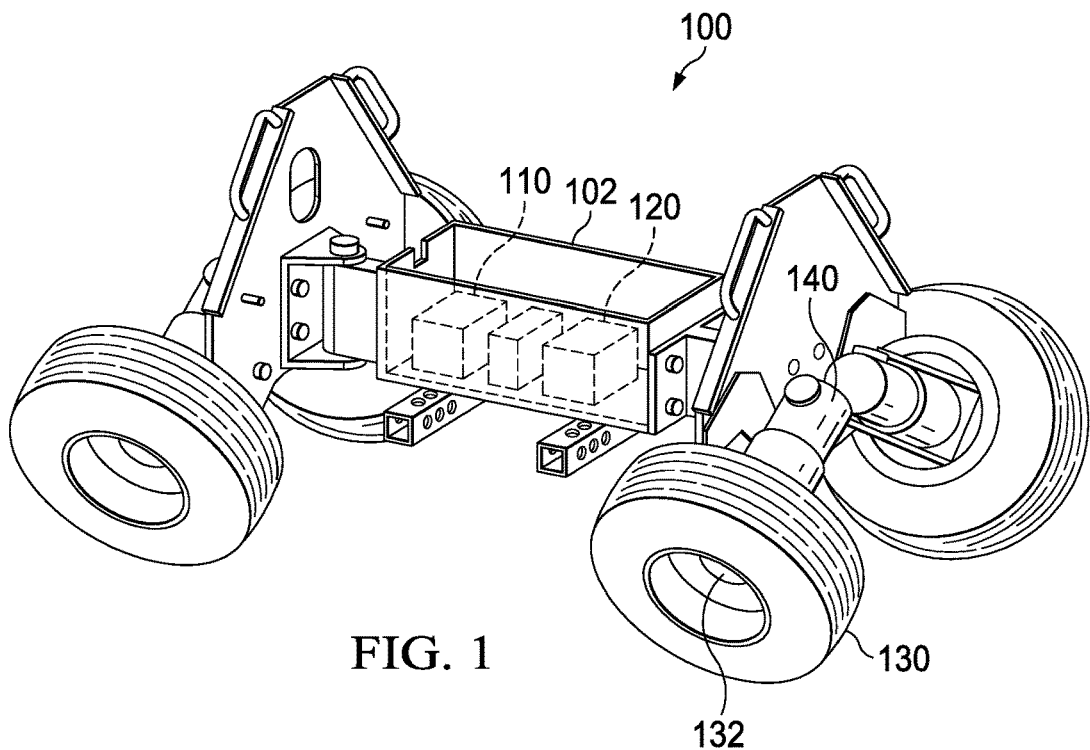
FIG. 1 illustrates a perspective view of a pipeline inspection device according to certain aspects of the present disclosure.
Figure 2:
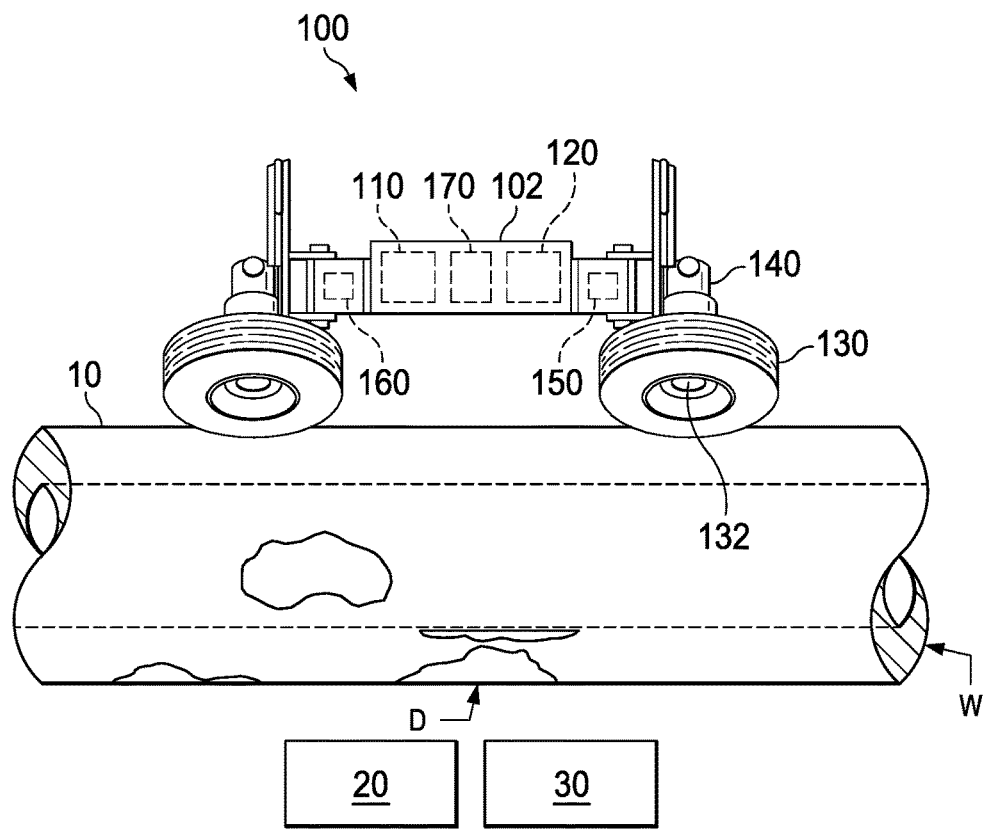
FIG. 2 illustrates a side elevation view of the pipeline inspection device of FIG. 1 disposed on a pipeline.

FIG. 1 illustrates a perspective view of a pipeline inspection device 100 according to certain aspects of the present disclosure. FIG. 2 illustrates a side elevation view of the pipeline inspection device 100 of FIG. 1 disposed on a pipeline 10. With reference to FIGS. 1 and 2, in the depicted example, a pipeline inspection device 100 can inspect a pipeline 10 with minimal human intervention. The pipeline inspection device 100 can include an imaging device 110 and a controller 120 disposed within a device housing 102. The device housing 102 can be moved along the pipeline 10 to allow the imaging device 110 to capture images along the pipeline 10.

The pipeline inspection device 100 includes a plurality of wheels 130 coupled to the device housing 102 to allow the pipeline inspection device 100 to move relative to the pipeline 10. The wheels 130 can extend away from the device housing 102. In some embodiments, the pipeline inspection device 100 includes four wheels 130. Optionally, the pipeline inspection device 100 can utilize wheels, sliders, treads, or other suitable features to allow the device housing 102 to the pipeline inspection device 100 to move relative to the pipeline 10. The wheels 130 or other features of the pipeline inspection device 100 can allow the pipeline inspection device 100 to travel along the pipeline 10 and over support saddles, other structures, and/or imperfections without stopping or interrupting the inspection operations of the pipeline inspection device 100 described herein.

In some embodiments, each of the wheels 130 can be independently driven, rotated, or otherwise controlled. For example, each wheel 130 can be driven by an independent motor 140 rotatably coupled to the wheel 130. An axle 132 extending from the motor 140 can couple a wheel 130 to a respective motor 140.

Figure 3:
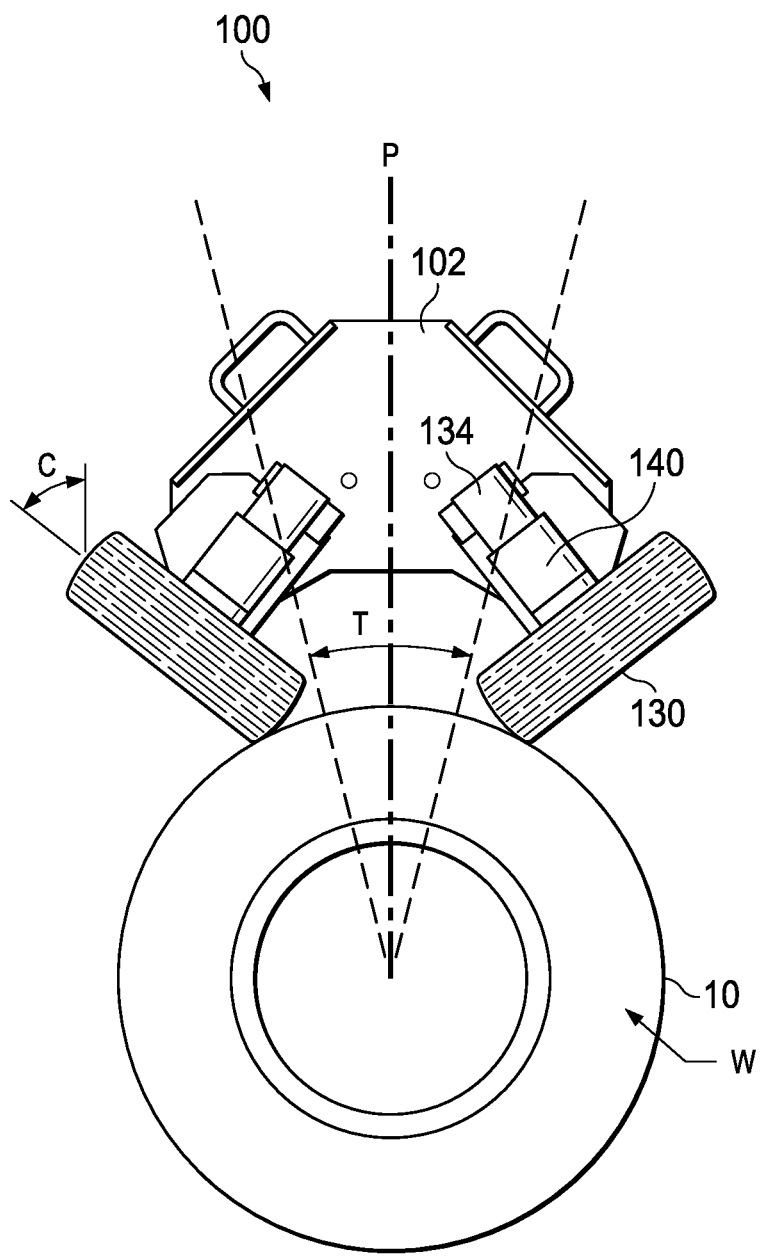
FIG. 3 illustrates a front elevation view of the pipeline inspection device of FIG. 1 disposed on a pipeline.

FIG. 3 illustrates a front elevation view of the pipeline inspection device 100 of FIG. 1 disposed on a pipeline 10. With reference to FIGS. 1-3, the pipeline inspection device 100 can be used to inspect pipelines 10 including pipes of various diameters. The camber angle C of the wheels 130 can be adjusted relative to the device housing 102 to allow the wheels 130 of the pipeline inspection device 100 can securely contact or engage with the surface of pipes of varying diameters. In some embodiments, the axle 132 connecting the wheel 130 to the motor 140 can include a swivel joint 134 to allow the wheel 130 to be disposed at a desired camber angle C relative to the device housing 102 as the wheel 130 is rotated. As can be appreciated, each axle 132 can include a similar swivel joint 134.

During operation, the motors 140 can be operated to advance the pipeline inspection device 100 relative to the pipeline 10, allowing inspection of the pipeline 10 as the pipeline inspection device 100 is in motion. The speed of the pipeline inspection device 100 can be adjusted to suit the conditions of the pipeline 10 and/or the parameters of the inspection. As described herein, the pipeline inspection device 100 can be remotely operated by an operator. The pipeline inspection device 100 can be remotely controlled by a tethered device or a wirelessly connected device.

In the depicted example, a controller 120 disposed within the device housing 102 can control the operation of the wheels 130 to control the position and advancement of the pipeline inspection device 100 relative to the pipeline 10. During operation, each motor 140 of the pipeline inspection device 100 can be independently controlled by the controller 120 to cooperatively advance and align the pipeline inspection device 100 relative to the pipeline 10. In some embodiments, the controller 120 can independently operate each motor 140 at a desired speed and direction to advance and align the pipeline inspection device 100. As can be appreciated, each motor 140 can be operated at a different speed and/or direction to provide a desired operation of the pipeline inspection device 100.

Optionally, the controller 120 can utilize signals from inertial measurement units (IMUs) 150 to calculate or determine the intended speed and direction of each motor 140. The pipeline inspection device 100 can include multiple IMUs 150 within the device housing 102 to robustly determine the orientation of the pipeline inspection device 100 relative to the pipeline. In some embodiments, the pipeline inspection device 100 includes a single IMU 150 associated with the device, an IMU 150 associated with each axle 132 of the pipeline inspection device 100, or an IMU 150 associated with each wheel 130 of the pipeline inspection device 100. The IMUs 150 can include various sensors, including, but not limited to gyroscopic sensors, accelerometers, magnetometers (e.g. triaxial magnetometers), etc. In the depicted example, the data from the IMU 150 can allow the controller 120 to determine the speed of the pipeline inspection device 100, the heading of the pipeline inspection device 100, and other parameters related to the status of the pipeline inspection device 100. The pipeline inspection device 100 can further include other sensors, such as wheel speed encoders to provide additional data to the controller 120. Advantageously, sensors such as the IMU 150 and the wheel speed sensors can allow the controller 120 to detect outside interference or changes in parameters, including wheel slip, wind, uneven pipe surfaces, etc.

The configuration or programming of the controller 120 can allow for the pipeline inspection device 100 to navigate turns, elbows, or bends along the pipeline 10. In the depicted example, the controller 120 can interpret input (such as start, stop, forward, and/or back commands) from an operator and utilize one or more algorithms to control the operation of the pipeline inspection device 100. In some applications, the controller 120 can verify operation parameters via feedback from IMUs 150, wheel speed sensors, and/or sub-routines that allows for self-correction of the motion of the pipeline inspection device 100. For example, the controller 120 may receive a start (forward or backward) command from an operator to initiate travel or motion of the inspection device and then utilize feedback from the IMUs 150 and/or control algorithms of the controller 120 to navigate the path of the pipeline 10 and/or negotiate obstacles or imperfections of the pipeline 10.

Upon encountering a turn, such as an elbow turn in the pipeline 10, the controller 120 can utilize various parameters (e.g. pipe OD, elbow turning ratio, target speed, etc.) to provide speed commands and/or adjust the rotation of the wheels of the pipeline inspection device 100. In some embodiments, the control signals for balancing and turning the pipeline inspection device 100 can be linearly overlaid, allowing the pipeline inspection device 100 to simultaneously turn and remain balanced on the pipeline 10. As described herein, the operational parameters of the pipeline inspection device 100 can be set via a graphical user interface. In some embodiments, the graphical user interface can be used to provide override commands.

Upon encountering an obstacle, the controller 120 can direct the pipeline inspection device 100 to tilt toward one side of the pipeline 10 and utilize feedback signals from the IMUs 150 to calculate and provide speed commands and/or adjust the rotation of the wheels of the pipeline inspection device 100 to balance the pipeline inspection device 100. Signals from the IMUs 150 can include, but are not limited to the magnitude of the tilting angle, the duration of the tilting angle, etc.

The controller 120 may prioritize commands from the operator and/or various safety sub-routines. Further, the controller 120 can adjust the operation of the pipeline inspection device 100 based on outside interference or changes in parameters, including wheel slip, wind, uneven pipe surfaces, etc.

During operation, the controller 120 can operate the motors 140 at different speeds to allow the pipeline inspection device 100 to negotiate pipe shapes or bends. For example, the motors 140 of the left side of the pipeline inspection device 100 can be rotated or accelerated at a faster rate than the motors 140 of the right side of the pipeline inspection device 100, allowing the pipeline inspection device 100 to follow a pipeline 10 that turns toward the right. Each wheel 130 or axle unit can be independently controlled. In another example, the motors 140 of the front axle can be rotated or accelerated at a different rate than the motors 140 of the rear axle of the pipeline inspection device 100, allowing the pipeline inspection device 100 to negotiate changes in inclination (z-axis) of the pipeline 10.

Advantageously, by allowing for different wheel speeds and/or directions for each of the wheels 130 of the pipeline inspection device 100, the pipeline inspection device 100 can navigate and inspect complex pipeline layouts or paths with minimal human intervention.

Further, the configuration or programming of the controller 120 can allow for the pipeline inspection device 100 to self-balance or self-align on an upper portion or top of the pipeline 10. In the depicted example, the controller 120 can utilize feedback from the IMUs 150 to determine the tilt of the pipeline inspection device 100 relative to the pipeline 10 and operate one or more motors 140 to maintain and/or re-align the pipeline inspection device 100 at the top of the pipe azimuth position P. In some embodiments, the sensitivity of the controller 120 in response to feedback from the IMU's 150 can be adjusted for varying pipeline diameters, pipeline conditions, and straight and/or curved (e.g. elbows) pipelines 10.

The controller 120 can monitor signals or feedback from the IMUs 150 to determine if the pipeline inspection device 100 has departed from a determined tilt range T. In some embodiments, the tilt range T can be +/−15 degrees from a center line of the vertical plane. As can be appreciated, the tilt range T can be predefined, varied, or adjusted for varying curvature planes, pipeline conditions, and inspection parameters. In some embodiments, the controller 120 and/or the pipeline inspection device 100 can be configured to travel along the pipeline 10 at an offset angle relative to the top of the pipe.

In response to a determination that the pipeline inspection device 100 has exceeded the determined tilt range T, the controller 120 can operate one or more motors 140 to reposition the pipeline inspection device 100. For example, if the pipeline inspection device 100 has tilted too far toward the left side of the pipe, the controller 120 can operate the left side motors 140 while deactivating the right side motors 140, allowing the pipeline inspection device 100 to be realigned toward the top of the pipeline.

In some applications, in response to a determination that the pipeline inspection device 100 has exceeded the determined tilt range T, the operation of the pipeline inspection device 100 can be disabled to avoid damage to the pipeline inspection device 100. As can be appreciated, the "fail-safe" tilt range T can be varied or adjusted for pipeline conditions and inspection parameters.

Further, the controller 120 can utilize pitch or inclination data from the IMUs 150 to control the ascending and/or descending movement of the front and rear wheels 130 of the pipeline inspection device 100. Advantageously, the controller 120 can utilize the inclination data to control the operation of the pipeline inspection device 100 over elevation changes of the pipeline.

During operation, the controller 120 can utilize self-learning or machine learning routines to optimize the operation of the pipeline inspection device 100 for various pipeline conditions. For example, the controller 120 can self-learn or adapt to allow the pipeline inspection device 100 to remain in a determined tilt range with minimal deviation from the top azimuth of the pipeline.

Advantageously, the independent control of the wheels 130 via the controller 120 allow for high levels of autonomous operation of the pipeline inspection device 100 without human intervention or interruption.

The controller 120 can collect and record operational data regarding the pipeline inspection device 100. For example, the controller 120 may collect and record the rotational speed of each of the wheels 130, the tilt angle of the pipeline inspection device 100, the crawling direction, encoded distance traveled, and/or commands received by the operator. As described herein, operational data may be overlaid with imaging or inspection data captured by the pipeline inspection device 100.

Optionally, the controller 120 can monitor or inspect the distribution of power within the pipeline inspection device 100. For example, the controller 120 can monitor the state of charge of the onboard battery 160 and/or the power usage of the components of the pipeline inspection device 100. In some embodiments, the controller 120 can provide a warning to the operator if the state of charge of the battery 160 is below a desired level and/or the power usage of the components of the pipeline inspection device 100 exceeds a specified threshold.

In some embodiments, the controller software is integrated with other functions of the pipeline inspection device 100. Optionally, the programming of the controller 120 and or the pipeline inspection device 100 can be updated remotely or via a network.

In the depicted example, the pipeline inspection device 100 includes one or more imaging devices 110 to allow for non-destructive inspection of the pipeline 10 as the pipeline inspection device 100 is advanced. In some embodiments, the imaging device 110 can be an x-ray device, or other suitable device.

The imaging devices 110 can provide an imaging signal to an image processor 20 associated with the pipeline inspection device 100. In some embodiments, the image processor 20 can be disposed at a location remote to the pipeline inspection device 100. The image processor 20 can be configured to automatically adjust and/or calibrate to process image signals from the imaging device 110 to provide detailed imaging of thin walled pipe, thick walled pipe, heavy walled pipe, pipe under insulation (wet or dry), and pipe filled with static or dynamic fluids, such as oil, gas, and/or water (including three phase product and flow undergoing slugging). Various calibration techniques can be utilized based on operating conditions and requirements. Advantageously, the imaging device 110 and the image processor 20 can provide images with sufficient levels of detail to allow the operator to determine if the pipeline is damaged (e.g. corrosion) and/or if the pipeline requires repair.

Optionally, the image processor 20 can process image signals to detect and analyze pipeline damage D (e.g. corrosion) and/or determine the remaining wall thickness W of the pipeline 10 wall. In some applications, the image processor 20 can process image signals to detect pipeline damage D, such as corrosion, to infer the loss of wall thickness W on the outside of the pipe. The image processor 20 may identify or recognize defects by measuring the differential or attenuation of radiation transmission through the pipeline 10 material. For example, the inspection device 100 may utilize automated tangential radiography (ATRT) to tangentially image between the insulation and the pipe wall to detect and analyze pipeline damage D and infer the loss of wall thickness W. Advantageously, ATRT can be used to identify pipeline damage D internal to the pipeline 10, external to the pipeline 10, and/or to identify water under insulation of the pipeline 10.

Further, the image processor 20 can process image signals to detect the location of water within insulation material covering the outside of the pipeline. The image processor 20 may further identify areas of the pipeline 10 that require repair. In some embodiments, the image processor 20 can provide analysis of pipeline damage D automatically and/or with minimal human intervention.

For example, the image processor 20 can identify a reduction in wall thickness W by locating, identifying, and measuring neighboring pixels provided by the imaging device 110. In some embodiments, the image processor 20 can allow for real time radiography (RTR) techniques to be utilized. The image processor 20 may be able to automatically identify a reduction in wall thickness W by locating, identifying, and measuring differences in wall thickness within an imaging area or region of interest defined by a plurality of pixels (e.g. an imaging area of 25 pixels or less). In some embodiments, the image processor 20 may be able to identify a reduction in wall thickness W by locating, identifying, and measuring differences in wall thickness in a smaller region of interest, for example region of interest of 9 pixels or less.

For example, the image processor 20 can compare the relative brightness/darkness (gray level) of neighboring pixels to determine areas with reduced wall thickness. The image processor 20 can identify a reduction in wall thickness W across the image by analyzing multiple regions of interest of the image. In some embodiments, the regions of interest may overlap.

During operation, data from the image processor 20 can be recorded for logging and/or review by an operator. In some embodiments, the data from the image processor 20 can be transmitted to an operator for real-time observation. Data can be recorded and/or transmitted in a wide range of formats (e.g. TIFF and/or DICONDE standard formats). In some embodiments, the data can be reformatted or adjusted to provide images in a desired image size, multiple images merged and/or spliced together in sequence. Optionally, the data can be dynamically filtered and/or overlaid with additional data, such as distance travelled data or other capture parameters.

In some embodiments, the pipeline inspection device 100 and/or the imaging devices 110 can be remotely operated by an operator. In some embodiments, the pipeline inspection device 100 operates autonomously, with minimal to no human intervention. Optionally, an operator can control certain aspects of operation of the pipeline inspection device 100 and/or the imaging device 110 while other aspects of operation are autonomously controlled by the pipeline inspection device 100.

The pipeline inspection device 100 can be tethered to a remote control device 30 via a cable or wirelessly connected to a remote control device. In some embodiments, if a tethered or wireless communication link is broken or compromised, the motors 140 of the pipeline inspection device 100 may be stopped. Further, power to an onboard air compressor 170 and/or other components of the pipeline inspection device 100 can be interrupted.

Figure 4:
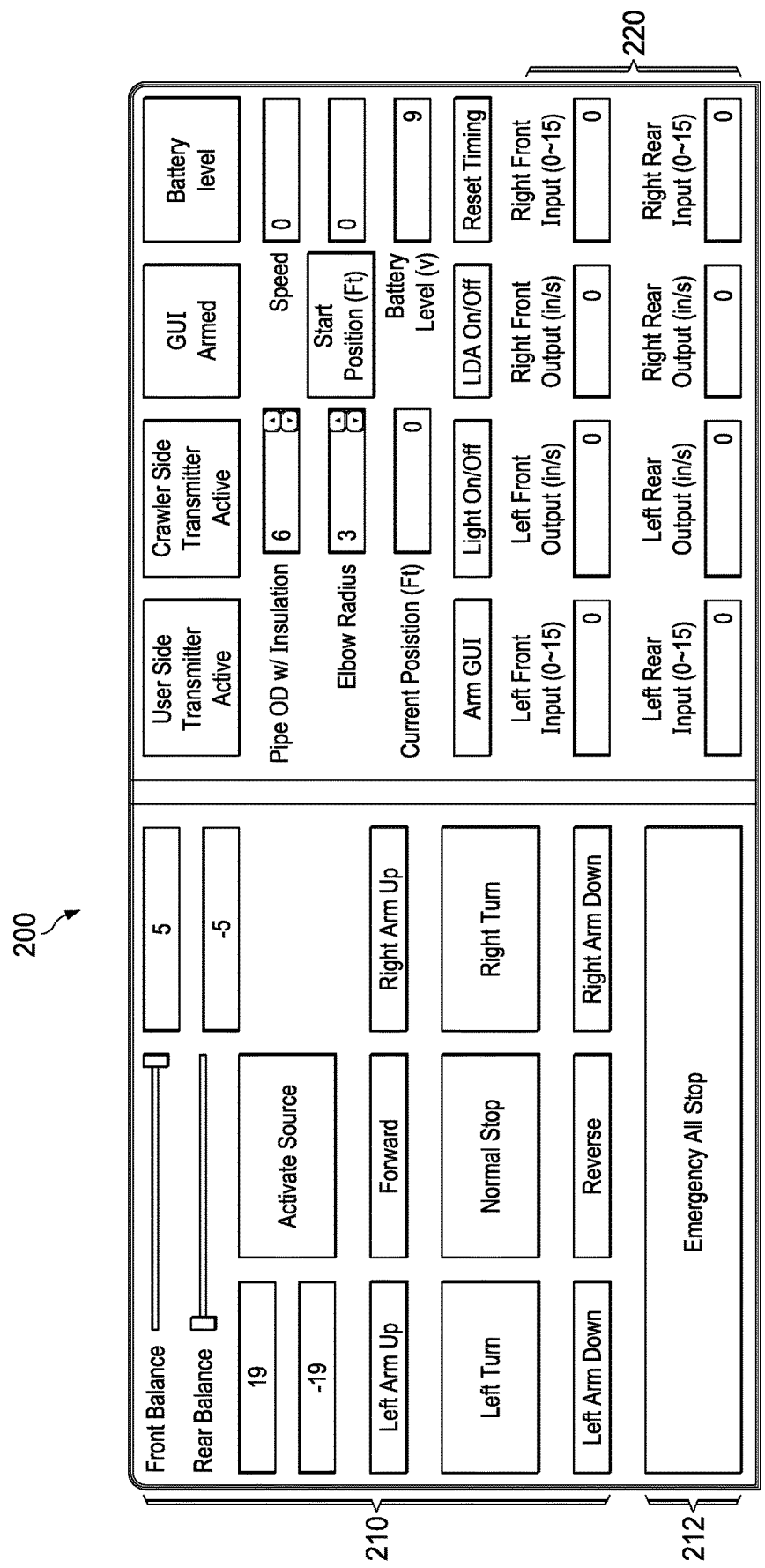
FIG. 4 illustrates a graphical user interface for use with the pipeline inspection device according to certain aspects of the present disclosure.

Optionally, the remote operation can be integrated into an inspection software program executed on a remote computing device or remote control device 30. FIG. 4 illustrates a graphical user interface 200 for use with the pipeline inspection device 100 according to certain aspects of the present disclosure. With reference to FIG. 4, an operator can interact with the pipeline inspection device 100 via a graphical user interface 200 displayed by the remote control device 30. The graphical user interface 200 allows the operator to provide inputs or commands 210 to the controller 120 of the pipeline inspection device 100 and receive data from the controller 120 of the pipeline inspection device 100.

For example, the graphical user interface can receive commands 210 from the operator and provide these inputs to the controller 120 of the pipeline inspection device 100. Further, the graphical user interface can receive and process override interrupt and/or emergency stop commands 212.

The graphical user interface 200 can further provide feedback or signals to the operator. For example, the graphical user interface can provide feedback regarding the operating parameters 220 of the pipeline inspection device 100. In some embodiments, the graphical user interface can provide a signal or alert if critical parameters deviate from a nominal value (e.g. low battery state of charge) or if communication between the remote control device 30 and the pipeline inspection device 100 is terminated or otherwise compromised.

It is understood that variations may be made in the foregoing without departing from the scope of the present disclosure. In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes, and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

The invention claimed is:

1. A device to inspect a pipeline, the device comprising:
    a device housing;
    a plurality of motors coupled to the device housing;
    a plurality of wheels extending from the device housing, wherein each wheel is rotatable and coupled to a respective motor of the plurality of motors;
    an inertial measurement unit configured to provide a signal corresponding to an orientation of the device housing relative to the pipeline; and
    a controller configured to independently control operation of each motor of the plurality of motors based on the signal provided by the inertial measurement unit to maintain the device housing within a desired orientation range along an outer surface of the pipeline.

2. The device of claim 1, wherein the desired orientation range comprises a desired tilt range.

3. The device of claim 1, wherein the controller is further configured to independently control operation of each motor of the plurality of motors based on the signal provided by the inertial measurement unit to advance the device housing relative to the pipeline.

4. The device of claim 3, wherein the controller is further configured to independently control operation of each motor of the plurality of motors based on the signal provided by the inertial measurement unit to advance the device housing around a horizontal bend in the pipeline.

5. The device of claim 1, wherein the controller is further configured to operate a first motor of the plurality of motors at a first speed and to operate a second motor of the plurality of motors at a second speed, wherein the first speed is different than the second speed.

6. The device of claim 1, wherein a wheel of the plurality of wheels is disposed at a camber angle relative to the device housing.

7. The device of claim 6, wherein the camber angle is adjustable.

8. The device of claim 7, further comprising an axle rotatably coupling the wheel to the respective motor of the plurality of motors.

9. The device of claim 8, wherein the axle comprises a swivel joint to adjust the camber angle of the wheel relative to the device housing.

10. The device of claim 1, wherein the inertial measurement unit comprises an accelerometer.

11. A device to inspect a pipeline, the device comprising:
    a device housing;
    a plurality of wheels extending from the device housing, wherein each wheel is rotatably coupled to the device housing;
    a motor coupled to at least one wheel of the plurality of wheels, wherein the motor is configured to advance the device housing relative to the pipeline;
    a radiographic imaging device directed toward the pipeline configured to image through the pipeline to provide an imaging signal; and
    a processor configured to identify a remaining wall thickness of the pipeline based on the imaging signal provided by the imaging device.

12. The device of claim 11, wherein the processor is further configured to identify the remaining wall thickness of the pipeline, within a region of interest comprising of a plurality of pixels.

13. The device of claim 12, wherein the region of interest is less than or equal to 25 pixels.

14. The device of claim 12, wherein the region of interest is less than or equal to 9 pixels.

15. The device of claim 11, wherein the processor is further configured to identify the remaining wall thickness of the pipeline, wherein the pipeline includes damage internal to the pipeline.

16. The device of claim 11, wherein the processor is further configured to identify the remaining wall thickness of the pipeline, wherein the pipeline includes external corrosion.

17. The device of claim 11, wherein the processor is further configured to identify the remaining wall thickness of the pipeline, wherein the pipeline comprises water-saturated insulation surrounding the pipeline.

18. The device of claim 11, wherein the processor is further configured to identify the remaining wall thickness of the pipeline, wherein the pipeline comprises heavy-walled pipe.

19. The device of claim 11, wherein the processor is further configured to identify the remaining wall thickness of the pipeline, wherein the pipeline contains at least one of gas, water, and oil.

20. The device of claim 19, wherein the at least one of gas, water, and oil is in motion within the pipeline.

21. The device of claim 11, wherein the processor is further configured to identify corrosion on an exterior surface of the pipeline and determine the remaining wall thickness of the pipeline.

22. The device of claim 21, wherein the exterior surface includes an insulation coating of the pipeline.

23. The device of claim 22, wherein the processor is further configured to identify a location of moisture contained within the insulation coating of the pipeline.

24. A method to inspect a pipeline, the method comprising:
    advancing a pipeline inspection device along the pipeline by independently rotating a plurality of motorized wheels;
    obtaining an imaging signal from a radiographic imaging device directed toward the pipeline to image through the pipeline; and
    identifying a remaining wall thickness of the pipeline based on the imaging signal provided by the imaging device.

25. The method of claim 24, further comprising maintaining the pipeline inspection device within a desired orientation range relative to the pipeline by independently rotating the plurality of motorized wheels.

26. The method of claim 24, further comprising independently controlling operation of each motorized wheel of the plurality of motorized wheels based on a signal provided by an inertial measurement unit.

27. The method of claim 24, further comprising identifying the remaining wall thickness based on an area of an image created by the imaging signal provided by the imaging device, wherein the area of the imaging signal is less than or equal to 25 pixels.

28. The method of claim 27, wherein the area of the image is less than or equal to 9 pixels.

29. The method of claim 24, further comprising identifying the remaining wall thickness.

\* \* \* \* \*